United States Patent [19]

Hooper et al.

[11] Patent Number: 4,763,777
[45] Date of Patent: Aug. 16, 1988

[54] RECIPROCATING DISCHARGER

[75] Inventors: Anthony W. Hooper, Quebec; André Martel, Fleurimont, both of Canada

[73] Assignee: Uniweld, Inc., Quebec, Canada

[21] Appl. No.: 913,472

[22] Filed: Sep. 30, 1986

[51] Int. Cl.4 ............................................. B65G 25/08
[52] U.S. Cl. ................................... 198/747; 198/741; 414/306
[58] Field of Search ......................... 198/737, 741, 747; 414/306, 304, 325, 509, 512, 513, 516, 517

[56] References Cited

U.S. PATENT DOCUMENTS

| | | | |
|---|---|---|---|
| 1,837,994 | 12/1931 | Preston | 198/747 |
| 2,511,332 | 6/1950 | Denison, Jr. | 198/741 |
| 3,525,446 | 8/1970 | Grafstrom | 414/525 R |
| 3,828,920 | 8/1974 | Becker et al. | 198/741 |
| 3,923,149 | 12/1975 | Stearns | 198/747 |
| 4,157,761 | 6/1979 | Debor | 414/304 |

FOREIGN PATENT DOCUMENTS

| | | | |
|---|---|---|---|
| 97979 | 8/1979 | Japan | 198/741 |
| 908695 | 3/1982 | U.S.S.R. | 198/741 |

OTHER PUBLICATIONS

Brochure Showing the Hooper SR Discharger, 1982.

Primary Examiner—Robert J. Spar
Assistant Examiner—Janice Krizek
Attorney, Agent, or Firm—Larson and Taylor

[57] ABSTRACT

A reciprocating discharger for discharging solid materials from the underside of a pile, has at least one reciprocating stoker rod with a piston arm at one end reciprocating in a stationary cylinder which is mounted on a thrust member frame. The frame has a width greater than the length of a piston stroke, so that the piston arm does not extend outside the frame, which answers that the solid materials in the pile do not contact the piston arm.

11 Claims, 2 Drawing Sheets

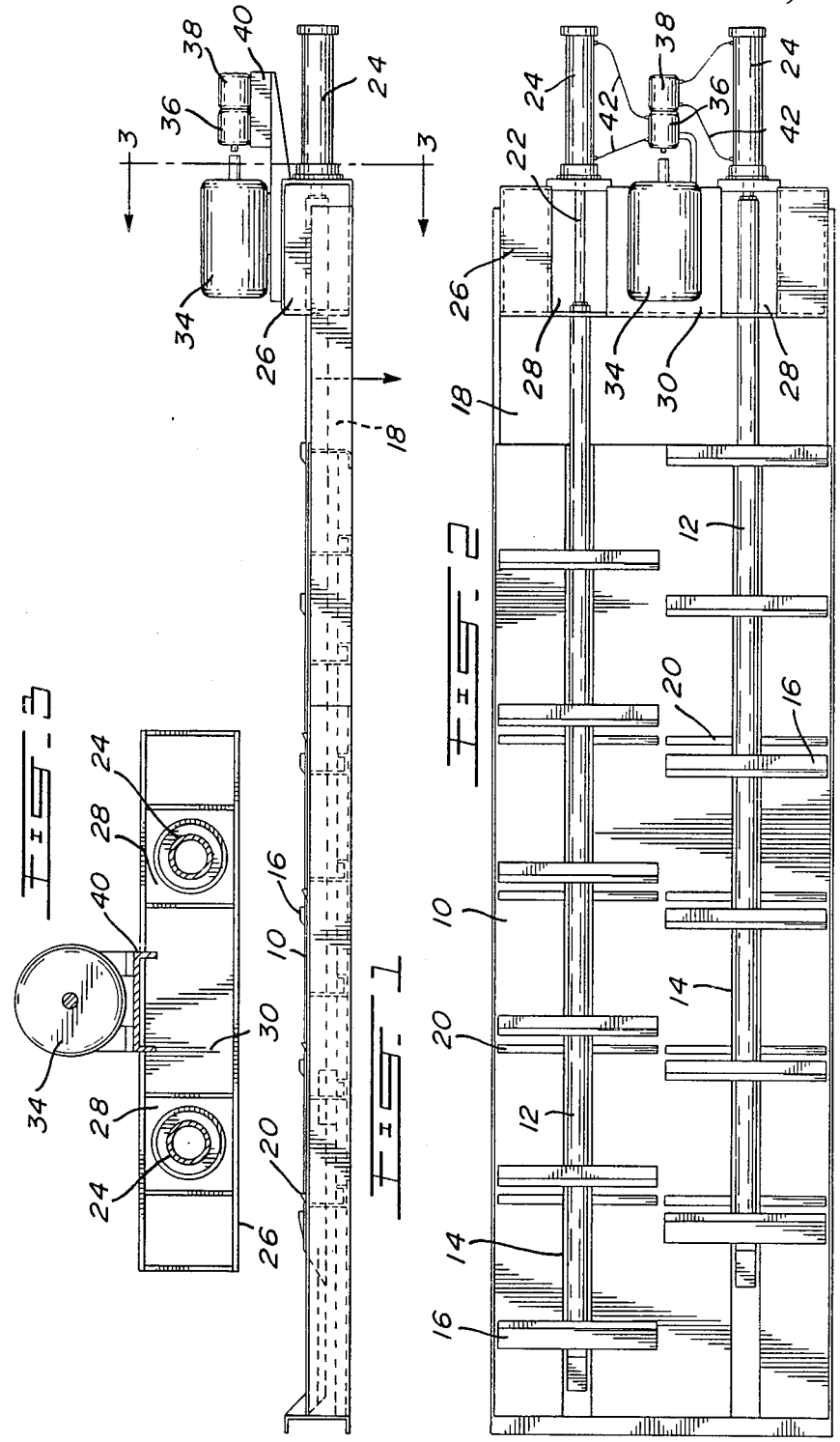

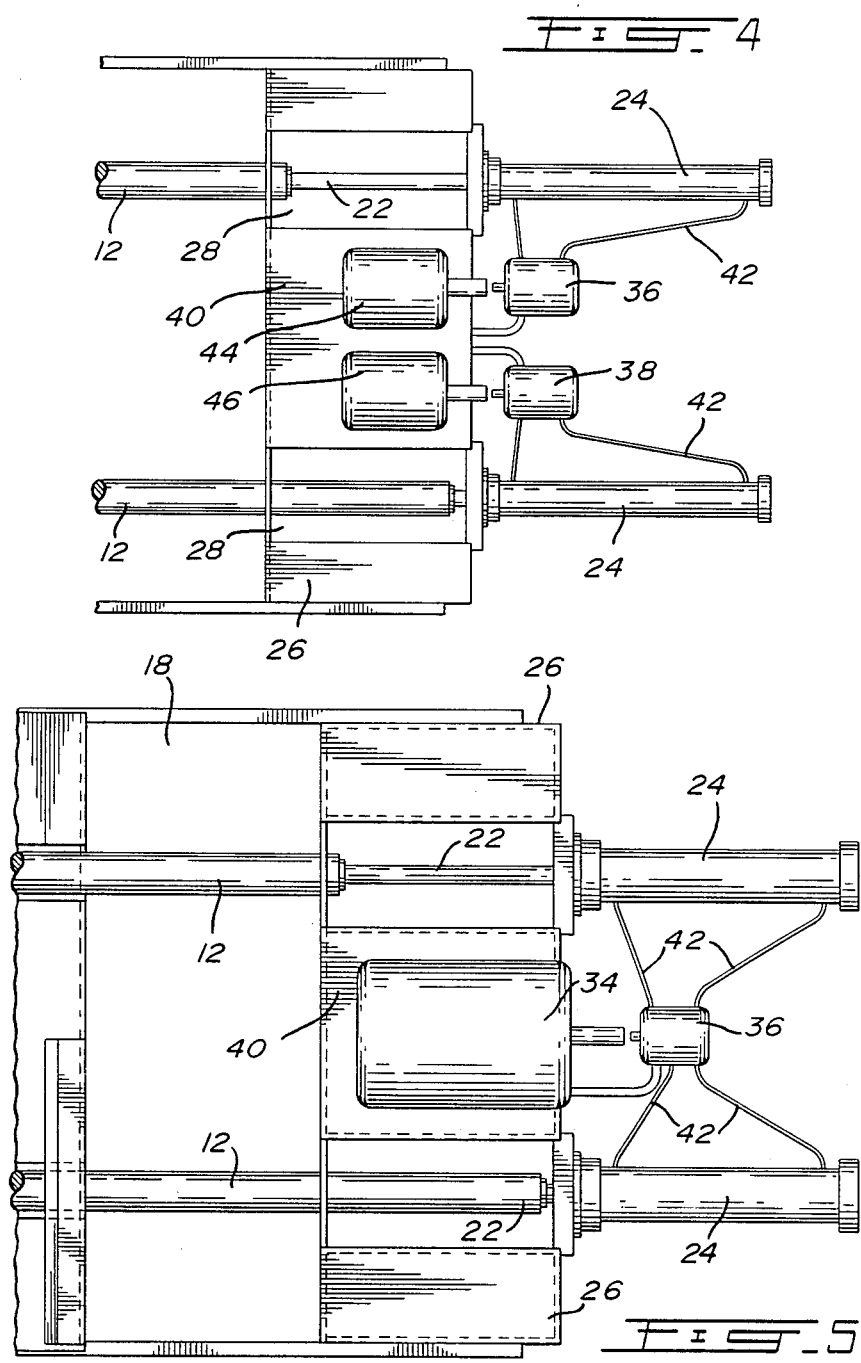

RECIPROCATING DISCHARGER

The present invention relates to a discharger for discharging solid materials from the underside of a pile. More specifically, the present invention provides a discharger which utilizes at least one reciprocating stoker rod with a piston arm at one end reciprocating in a stationary cylinder. The stationary cylinder is mounted on a thrust member frame which may form part of a bin or hopper.

Dischargers which are sometimes referred to as feeder mechanisms or stoker mechanisms, may be installed on a floor or flat surface for discharging solid materials into a conveyor. Such materials include granular materials, pellets, chips, and all types of particulate materials that can be piled or placed in bins or hoppers. Bark or wood chips are stored in piles at paper mills. The stoker mechanisms are sometimes mounted on the floor or a hopper or bin. One example of a stoker discharger mechanism is shown in U.S. Pat. No. 4,157,761 to Debor. This discharger has at least two parallel stoker rods which each reciprocate under the pile. Each stoker rod has a series of cross bars which push or pull the material towards a discharge outlet. The stoker rod has a piston arm connected at one end which reciprocates in a fixed cylinder. The cylinder is mounted on a thrust member positioned at one side of the floor or base beneath the pile.

The discharge outlet from a discharger mechanism may be located at almost any position along the stoker rod. One common location is at the end of the stoker rod adjacent the cylinder. In this location, the piston arm passes through the discharge outlet as it reciprocates in the cylinder. Thus discharging material comes in contact with the piston arm which can cause a problem if dust or other material sticks to the arm and is then drawn past the seal into the cylinder. The present invention provides a thrust member frame which is wider than the stoke of the piston arm, and thus the piston arm itself does not enter into the area while material is being discharged. Furthermore, by providing a wide thrust member frame, there is space in the frame which can be used for a hydraulic reservoir. This allows a power unit to be mounted either adjacent one stoker assembly or between two stoker assemblies, without the necessity of having to have long runs of hydraulic hoses or pipelines and thus providing a compact self contained unit.

It is an aim of the present invention to provide an improved discharger assembly having at least one reciprocating stoker rod with a piston arm connected to a cylinder at least at one end and with the piston arm protected so that it does not enter the area where material is stored or dischraged. It is a further aim to provide a power unit integral with a hydraulic reservoir built into a thrust member frame supporting the cylinder. It is a still further aim to provide a serivce opening in the thrust member frame to allow the piston arm and cylinder assembly to be disconnected and removed without having to remove the stoker rod, and without having to enter the bin or disturb the pile.

The present invention provides in a discharger assembly for discharging solid materials from the underside of a pile, the assembly including at least one stoker rod extending beneath the pile, the stoker rod being connected at least at at one end to a piston arm which reciprocates in a stationary cylinder, the cylinder mounted on a thrust member, the improvement wherein the thrust member comprises a frame having a width greater than the length of a piston stroke so that the piston arm does not extend outside the frame during reciprocation, and the cylinder is mounted on the outside of the thrust member frame.

In another embodiment of the invention there is provided in a discharger assembly for discharging solid materials from a floor of a bin or hopper, the assembly including at least two adjacent stoker rods extending on the floor of the bin or hopper, each stoker rod connected to a piston arm at least at one end, and each piston arm reciprocating in a stationary cylinder, the cylinders mounted on a thrust member at one side or end of the bin or hopper, the improvement wherein the thrust member comprises a frame having a width greater than the length of piston strokes, so that the piston arms do not extend into the bin or hopper during reciprocation, and the cylinders are mounted on the outside of the thrust member frame.

In other embodiments a power unit is integral with a hydraulic reservoir in the thrust member frame and the power unit is mounted on the thrust member frame for the cylinder or cylinders.

In drawings which illustrate embodiments of the invention:

FIG. 1 is a side elevational view of a stoker discharger according to one embodiment of the invention;

FIG. 2 is a top elevational view of the stoker discharger shown in FIG. 1;

FIG. 3 is a cross sectional view taken at line 3—3 of FIG. 1;

FIG. 4 is a partial top plan view showing another embodiment of a power unit for the stoker discharger;

FIG. 5 is a partial top plan view showing yet a further embodiment of a power unit.

The reciprocating discharger illustrated in the drawings has two stoker rod assemblies. In some applications, the adjacent stoker rod assemblies reciprocate out of phase one with another, and in other applications, the adjacent stoker rod assemblies reciprocate completely independently. Whereas two discharger rods are shown, one is feasible in certain circumstances and the present invention is applicable to one or more stoker rods.

As shown in FIGS. 1 to 3, a flat base 10 or a floor of a hopper, or the bottom of a pile has two stoker rods 12 which reciprocate in a trough or cavity 14 in the floor 10. Each stoker rod 12 has a series of cross bars 16 attached to it. The cross bars 16 have a wedge shaped cross section with a substantially vertical surface facing towards a discharge outlet 18. Fixed floor angles 20 are provided firmly attached to the floor 10 and parallel to the cross bars 16. The floor angles 20 act to prevent the solid material from backing up when the cross bars 16 are on the return stroke from the discharge stroke. Further details of the reciprocating mechanism are illustrated in U.S. Pat. No. 4,157,761.

The discharge outlet 18 is shown at one end of the discharger. One end of each stoker rod 12 is connected to a piston arm 22 which reciprocates in a cylinder 24. Both cylinders 24 are stationary and side by side substantially parallel to each other. The cylinders 24 are firmly attached to a thrust member frame 26. In one embodiment, the cylinders 24 are flange mounted on the outboard surface of the thrust member frame 26 as shown in the drawings. The frame 26 is constructed of steel plate and has a width that exceeds the stroke of the piston arm 22. The frame 26 has sufficient structural strength to hold the cylinders 24 in place and, for this reason, is attached rigidly to the floor 10. Openings are provided on the inside wall of the frame 26 for the reciprocating rods 12 to pass backwards and forwards. However, the piston arm 22 which enters the cylinder 24 does not enter the area where material is stored. Furthermore, discharged material passing to the outlet 18 does not contact the piston arm 22 because no material is permitted to pass into the frame 26.

On the top of the frame 26 is an opening 28 above each stoker rod 12 so that the piston arm 22 can be serviced by cleaning and, if necessary, the cylinder 24 and piston 22 removed without removing the stoker rod 12. Inside the thrust member frame 26 between the service openings 28 is a space which is used as a hydraulic oil reservoir 30.

As shown in FIG. 1, a motor 34 is mounted on top of the thrust member frame 26 above the reservoir 30 and has the drive shaft connected to two pumps 36 and 38. The pumps 36 and 38 may be mounted directly to the motor itself, or onto a motor base plate 40 as shown in FIG. 1. The pumps 36 and 38 and motor 34 form a power unit integral with the hydraulic reservoir 30 in the thrust member frame 26. Hoses 42 from the hyraulic reservoir 30 supply hydraulic fluid to the pumps which in turn supply fluid to the cylinders 24. The hoses 42 are short, which eliminates pressure drops and pressure shocks which can occur in long runs of hose or pipe. The instrumentation for the power unit may be mounted on the front plate of the thrust member frame 26, and includes level indicators for the reservoir and pressure indicators, together with other controls and indicators as needed.

FIGS. 1 to 3 show a power unit which utilizes one motor connected by a single shaft to two pump units 36 and 38. The two pump units are in line and coupled together. FIG. 4 shows another embodiment wherein the two pump units 36 and 38 have two separate motors 44 and 46. Thus each pump has its individual motor in this embodiment. It is appreciated that in this arrangement, one discharger unit may be run independently of the other discharger unit if desired.

FIG. 5 shows a single motor 34 connected to a single pump 36 with piping or hoses 42 to each cylinder 24. Control valves (not shown) may be mounted on the front face of the frame 26, on the pump 36, or the cylinder 24 to control the flow of hydraulic fluid to the required cylinder 24 such that the piston arms 22 reciprocate.

Whereas a hydraulic cylinder has been described herein, it is feasible that other suitable mechanical reciprocating devices may be used, however, one of the keys is ensuring that the piston arm 22 does not become exposed to the material in the bin or hopper. In the case of a hydraulic unit, by putting the reservoir for the hydraulic fluid in the thrust member frame, considerable reduction in pipe and hose runs is attained which reduces pressure drops and shock of long pipe runs. Furthermore, it is practical to have one pump per cylinder which is advantageous.

In the embodiments shown, the hydraulic cylinder is connected at one end of the stoker rod 12. However, in another embodiment there may be a hydraulic cylinder at each end of the stoker rod 12. This allows smaller cylinders or lower hydraulic pressure to be used.

Various changes may be made to the embodiments shown herein without departing from the scope of the present invention which is limited only by the following claims.

The embodiments of the invention in which an exclusive property or privilege is claimed are defined as follows.

1. In a discharger assembly for discharging solid materials from the underside of a pile, a floor beneath the pile, a plurality of fixed floor angles on said floor, at least one stoker rod extending along the length of said floor beneath the pile, a thrust member frame disposed adjacent one end of the floor and being fixedly mounted on said floor, a stationary cylinder mounted on the outer face of said thrust member frame remote from said one of said floor, a cylinder rod reciprocating within said cylinder, said cylinder rod being in adjoining alignment with said stoker rod and having the inner end thereof directly connected to the end of said stoker rod, said thrust member frame having a width greater than the length of the stroke of the cylinder rod, said cylinder rod in the outermost position thereof extending only within said thrust member frame whereby the cylinder rod does not extend outside the thrust member frame during reciprocation thereof to prevent exposure of the cylinder rod to the discharging solid materials from the pile on said floor.

2. The discharger assembly according to claim 1 wherein the cylinder is a hydraulic cylinder and a hydraulic reservoir is integral with the thrust member frame.

3. The discharger assembly according to claim 2 wherein a power unit is integral with the thrust member frame adjacent the cylinder, the power unit comprising a motor and pump with control means to reciprocate the stoker rod.

4. The discharger assembly according to claim 1 wherein a service opening is provided in the thrust member frame for removing the cylinder rod and cylinder without moving the stoker rod.

5. In a discharger assembly for discharging solid materials from the underside of a pile, a floor beneath the pile, a plurality of fixed floor angles on said floor, at least two adjacent stoker rods extending along the length of said floor beneath the pile, a thrust member frame disposed adjacent one end of the floor and being fixedly mounted on said floor, a pair of stationary cylinders mounted in parallel relationship on the outer face of said thrust member frame remote from said one end of said floor, a cylinder rod reciprocating within each said cylinder, each of said cylinder rods being in adjoining alignment with each of said stoker rods and having the inner ends thereof directly connected to the ends of said stoker rods, said thrust member frame having a width greater than the length of the stroke of the cylinder rods, said cylinder rods in the outermost position thereof extending only within said thrust member frame whereby the cylinder rods do not extend outside the thrust member frame during reciprocation thereof to prevent exposure of the cylinder rods to the discharging solid materials from the pile on said floor.

6. The discharger assembly according to claim 5 wherein the cylinders are hydraulic cylinders and a hydraulic reservoir is integral with the thrust member frame.

7. The discharger assembly according to claim 6 wherein a power unit for both cylinders is integral with the thrust member frame.

8. The discharger assembly according to claim 7 wherein the power unit includes one motor and two pumps with hydraulic connections between one pump and one cylinder.

9. The discharger assembly according to claim 7 wherein the power unit includes one motor connected to one pump with valve means and hydraulic connections to two hydraulic cylinders.

10. The discharger assembly according to claim 7 wherein the power unit for both cylinders includes one pump and one motor connected together for each of the two cylinders.

11. The discharger assembly according to claim 5 inluding a service opening on the top of the thrust member frame above each cylinder rod, such that the cylinder and cylinder rod can be disconnected from the stoker rod and removed without interfering with the solid materials.

* * * * *